Oct. 21, 1958 E. LEROY 2,857,010
SUSPENSION SYSTEM FOR VEHICLES
Filed June 28, 1955 4 Sheets-Sheet 3

INVENTOR.
Etienne Leroy
BY Michael S. Striker
Attorney

Oct. 21, 1958     E. LEROY     2,857,010
SUSPENSION SYSTEM FOR VEHICLES

Filed June 28, 1955     4 Sheets-Sheet 4

INVENTOR.
Etienne Leroy
BY
Michael S. Striker
Attorney

United States Patent Office 2,857,010
Patented Oct. 21, 1958

2,857,010

SUSPENSION SYSTEM FOR VEHICLES

Etienne Leroy, Reims, France, assignor to
Edmond Langeais, New York, N. Y.

Application June 28, 1955, Serial No. 518,629

10 Claims. (Cl. 180—59)

The present invention relates to a suspension system for vehicles, and more particularly to a rubber suspension system for the frame of a motor car.

It is one object of the present invention to provide in a vehicle a resilient suspension system which obtains a particularly smooth ride.

It is another object of the present invention to provide a suspension system for the frame of a vehicle for suspending the frame on the wheels on rubber links.

It is a further object of the present invention to provide a suspension system for a motor car in which the weight of the engine is used to counterbalance part of the weight of the frame and of the load carried by the frame.

It is a still further object of the present invention to provide a suspension system for motor cars in which the engine is at least partly supported on the rear wheel axle.

It is yet an object of the present invention to provide a suspension system for motor cars in which the frame of the vehicle is located below the wheel axes and is suspended by tensioned rubber links.

It is also an object of the present invention to provide a front end suspension for the frame of a vehicle in which the frame front portion is suspended by rubber links from the front wheel axles.

It is still a further object of the present invention to provide a rear end suspension for a motor car in which the rear end of the vehicle frame is suspended from the rear wheel shaft by rubber links.

With these objects in view, the present invention mainly consists in a frame suspension for a vehicle comprising, in combination, a substantially horizontal frame having a pair of pivot means at the front end thereof; a pair of arms connected to the pivot means and having rear ends located above the frame so that the arms extend rearwardly from said front end; a pair of front wheel axle means secured to the rear ends of the arms; suspension means consisting of rubber or of another resilient material connecting the rear ends of the arms with the frame; rear wheel shaft means located forwardly of the frame rear end and above the frame; an engine supporting frame mounted on said rear wheel shaft means; an engine supported on the front end of the engine supporting frame; and other suspension means consisting of rubber or of another resilient material connecting the rear end of the engine supporting frame with the frame rear end for suspending the frame on the rear wheel shaft means.

Resilient blocks consisting of rubber or of another resilient material are arranged between the frame and the front end of the engine supporting frame so that part of the engine weight is directly transferred to the frame.

The rubber suspension means are preferably rubber loops passing about pins which are secured to brackets.

Preferably the engine supporting frame is pivotally mounted on the rear wheel shaft means so that the weight of the engine tends to counterbalance the force acting on the rear end of the engine supporting frame and transmitted by the rubber loops located at the rear end of the frame.

The present invention also consists of a front end suspension in which a frame front end portion is suspended by rubber links on pivoted arms.

Another aspect of the present invention is a rear end suspension in which the rear end of the vehicle frame is suspended by rubber links on the rear end of an engine supporting frame whose front end is supported by rubber blocks on the vehicle frame.

The frame suspension according to the present invention is particularly advantageously applied to small sports cars. The engine pivots on the wheel shaft which considerably improves the ride of the vehicle. The frame of the vehicle on which the seats are supported is separated by shock and vibration absorbing rubber links from the engine so that the passengers hardly feel any vibrations caused by the engine. The combination of the front end suspension and the rear end suspension according to the present invention results in a motor car which hugs the road and steers extremely well in curves even at high speeds without any sway.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
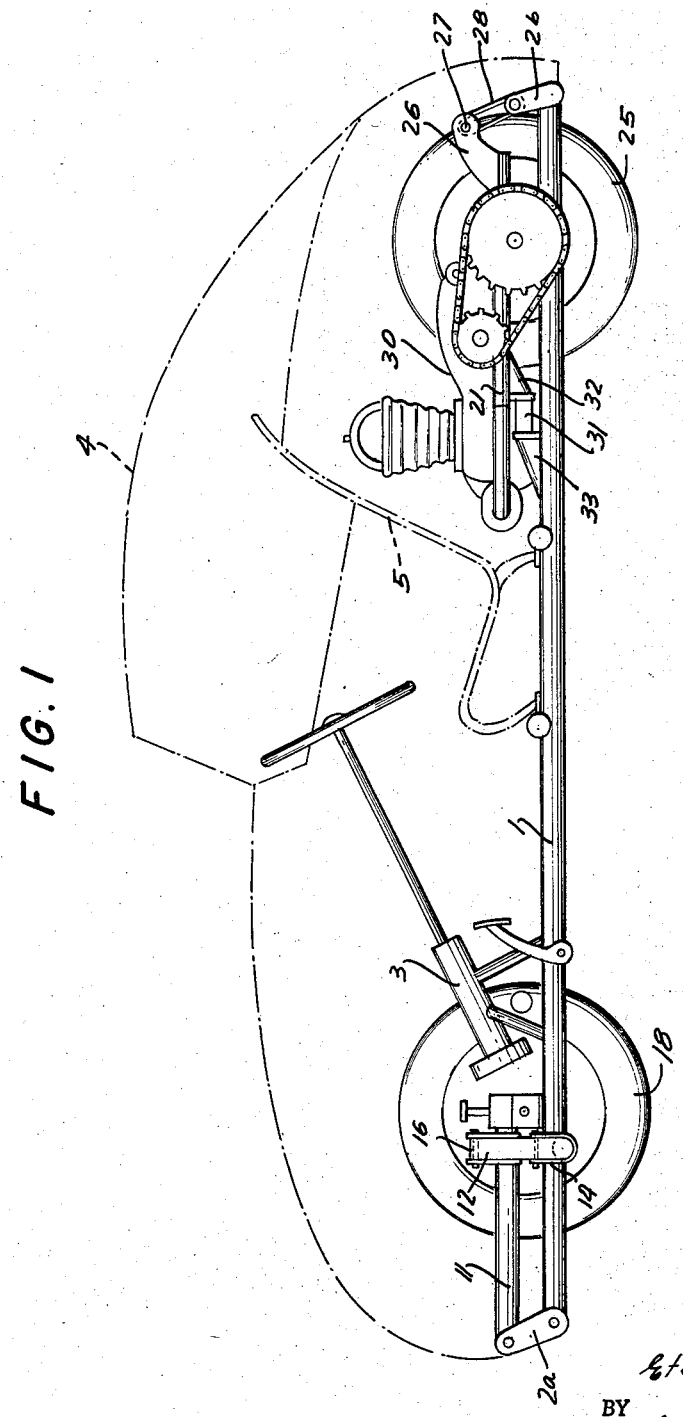
Fig. 1 is a side view of a suspension system according to the present invention.
Figure 3:
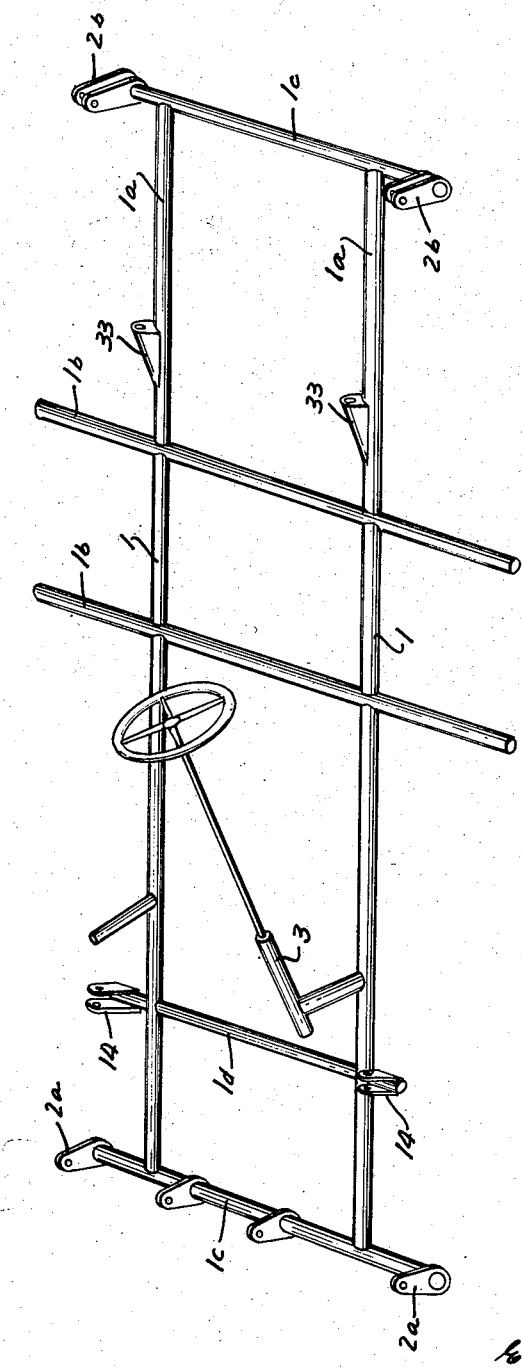
Fig. 3 is an isometric view illustrating a frame used in the arrangement of the present invention.

Referring now to the drawings, a frame 1, best seen in Fig. 3, comprises a pair of longitudinal members 1a, a pair of transverse members 1b, a pair of transverse end members 1c, and a transverse member 1d. Brackets 2a and 2b are secured to the end members 1c. The support for the steering wheel 3 is secured to one of the longitudinal members 1a, and the body of the vehicle 4, shown in broken lines in Fig. 1, is secured by suitable means to the transverse members 1b. Seats 5, shown in broken lines in Fig. 1, are also supported on the frame 1.

Figure 2:
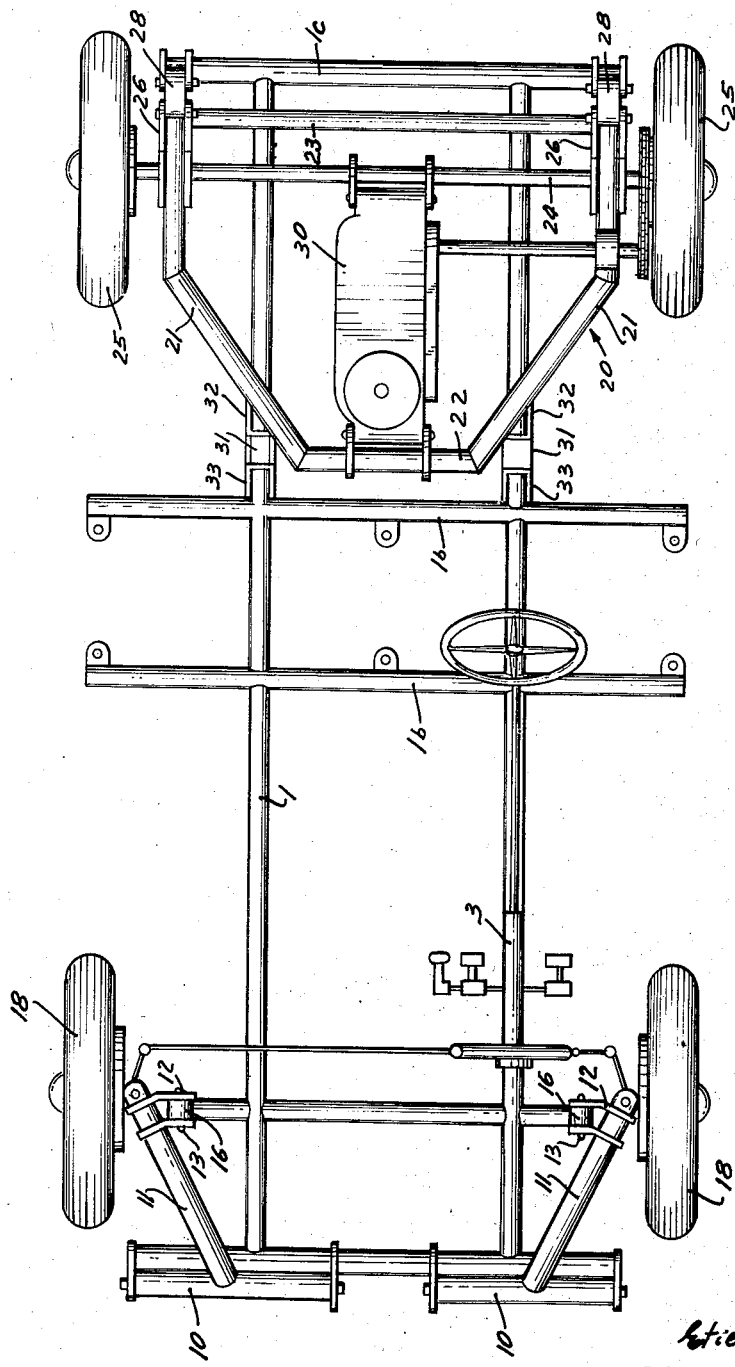
Fig. 2 is a plan view of a suspension system according to the present invention.

Referring now to Figs. 1 and 2, the front end suspension arrangement according to the present invention is constructed in the following manner. A pair of tubular members 10 are pivotally connected to the brackets 2a of the frame 1. Two arms 11 are fixedly secured at the front ends thereof to the tubular members 10 which constitute pivot means for the arms 11. The rear ends of the arms 11 carry brackets 12 provided with pins 13. Brackets 14 are secured to the transverse frame member 1d and are provided with pins 15. Rubber sleeves 16 pass about the pins 13 and 15. The rear ends of the arms 11 carry the supports 17 for the axles of the front wheels 18. Steering means 19 are connected to the axle supports for turning the front wheels 18 in a known manner.

Figure 4:
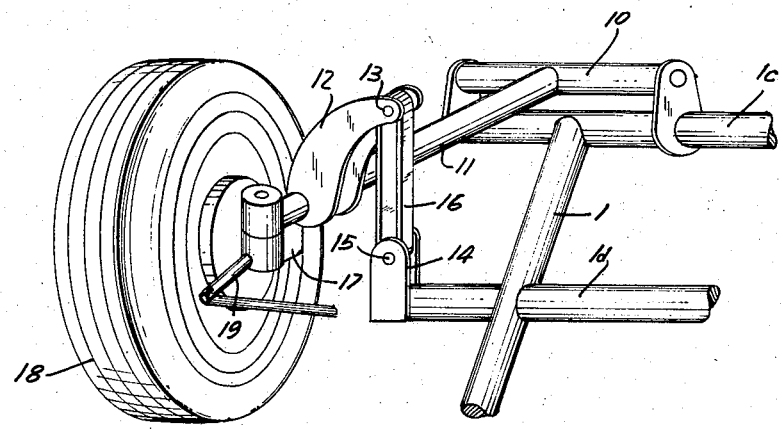
Fig. 4 is an isometric view illustrating a detail of a front end suspension according to the present invention.

As best seen in Figs. 2 and 4, the arms 11 extend from the pivot means 10 upwardly, rearwardly and outwardly with respect to the frame 1.

From the above description of the front end suspension according to the present invention, it will be understood that the frame 1 is suspended from the wheel axles by the resilient rubber means 16. The front wheels 18 are free to swing independently of each other in accordance with the road conditions. When one of the front wheels 18 moves upwardly, the resilient rubber link 16 is tensioned so that the shock transfer to the frame 1 is lessened.

Figure 5:
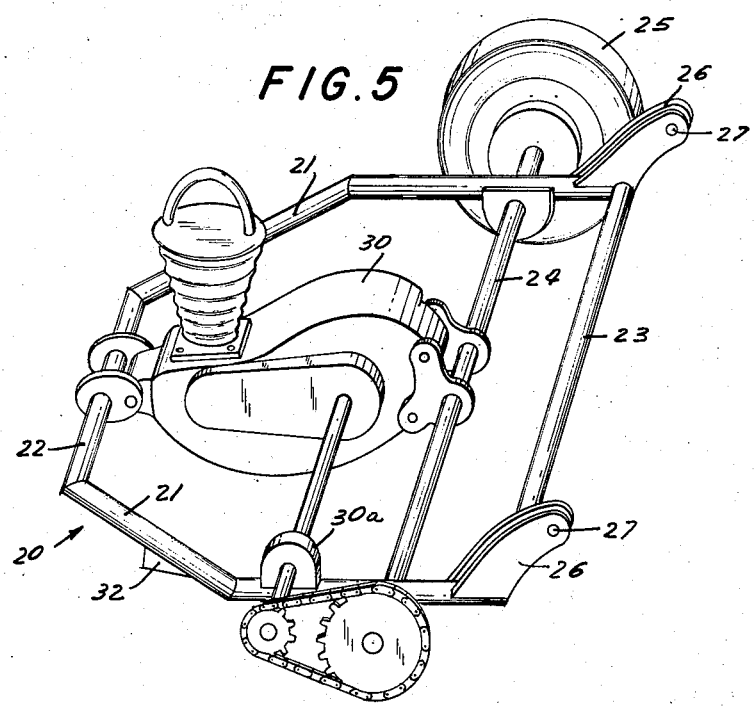
Fig. 5 is an isometric view illustrating a detail of the rear end suspension according to the present invention.

The rear end suspension according to the present invention is best seen in Figs. 1, 2 and 5. An engine supporting frame 20 includes two lateral members 21 connected at the front ends thereof by a connecting member 22 and at the rear ends by a connecting member 23. A tubular member 24 is rigidly connected to the lateral members 21 and houses the rear shaft on which the rear wheels 25 are supported.

Brackets 26 are fixed on the rear ends of the lateral members 21, and are provided with pins 27. Rubber sleeves 28 pass about the pins 27 mounted in the brackets 2b and 26. The portions of the lateral members 21 extending between the tubular member 24 and the pins 27 constitute arms pivoted on the rear shaft so that the rear end portion of the frame 1 is suspended on the rear shaft.

An engine means 30 is supported on the connecting member 22 and on the tubular member 24 of the engine supporting frame 20. Consequently, part of the weight of the engine 30 is directly supported by the rear shaft, while another part of the engine weight is supported on the front end of the engine supporting frame 20 and tends to counterbalance the force acting on the rubber links 28. Transmission means 30a connect the engine 30 with the rear wheel shaft.

Between the lateral members 21 and the frame 1 are provided a pair of rubber blocks or buffers 31 which directly transfer part of the engine weight to the frame 1.

In the illustrated embodiment, brackets 32 are secured to the lateral members 21, and brackets 33 are secured to the longitudinal frame members 1a, and the rubber blocks 31 are secured to opposite faces of the brackets 32 and 33. Consequently, the rubber blocks 31 are not compressed but bent when the engine supporting frame 20 swings.

When the rear wheels 25 move upwardly due to road conditions, the force is resiliently transferred to the frame 1 through the rubber links 28 and through the rubber blocks 31. When the load on the seats 5 tends to move the frame 1 downwardly, the engine 30 also moves downwardly and tends to pivot the engine supporting frame 20 counterclockwise in Fig. 1 so that the rear end of the engine supporting frame 26 tends to move upwardly and exerts an upward pull on the frame rear end, thereby partly compensating the downward action of the load on the seats 5.

It will be understood that each of the elements described above, or two or more together, may also find a useful application in other types of suspension systems differing from the types described above.

While the invention has been illustrated and described as embodied in a frame suspension for a motor car including an engine supporting frame resiliently connected by rubber links to the frame of the vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalency of the following claims.

What is claimed as new and desired to be secured by Letters Patent is:

1. An engine and rear end suspension for a vehicle, comprising, in combination, a frame rear end portion having a frame rear end; a rear wheel shaft means located forwardly of said frame rear end and above said frame rear end portion; an engine supporting means pivotally mounted on said rear wheel shaft means above said frame rear portion and having a rear end located rearwardly, and a front end located forwardly of said rear wheel shaft means; an engine means supported on said front end of said engine supporting means; a pair of downwardly projecting brackets secured to said front end of said engine supporting means and having front faces; a pair of upwardly projecting brackets secured to said frame rear end portion and having rear faces; and a pair of resilient blocks, each resilient block being located between an upwardly extending bracket and a downwardly extending bracket and fixedly secured to said front faces and rear faces thereof; pin means on said rear end of said engine supporting means, and pin means on said frame rear end; and a pair of loops consisting of a resilient material passing about said pin means and connecting said rear end of said engine supporting means with said frame rear end whereby said frame rear end portion is suspended on said rear wheel shaft means with said engine means counterbalancing the weight of said frame rear end portion.

2. An engine and rear end suspension for a vehicle, comprising, in combination, a frame rear end portion having a frame rear end; a rear wheel shaft means located forwardly of said frame rear end and above said frame rear end portion; an engine supporting means pivotally mounted on said rear wheel shaft means above said frame rear portion and having a rear end located rearwardly, and a front end located forwardly of said rear wheel shaft means; an engine means supported on said front end of said engine supporting means; supporting means consisting of a resilient material and connecting said front end of said engine supporting means and said frame rear end portion; pin means on said rear end of said engine supporting means, and pin means on said frame rear end; and a pair of loops consisting of a resilient material passing about said pin means and connecting said rear end of said engine supporting means with said frame rear end whereby said frame rear end portion is suspended on said rear wheel shaft means with said engine means counterbalancing the weight of said frame rear end portion.

3. An engine and rear end suspension for a vehicle, comprising, in combination, a frame rear end portion having a frame rear end; a rear wheel shaft means located forwardly of said frame rear end and above said frame rear end portion; an engine supporting means pivotally mounted on said rear wheel shaft means above said frame rear portion and having a rear end located rearwardly, and a front end located forwardly of said rear wheel shaft means; an engine means supported on said front end of said engine supporting means; rubber supporting means connecting said front end of said engine supporting means and said frame rear end portion; pin means on said rear end of said engine supporting means, and pin means on said frame rear end; and a pair of rubber loops passing about said pin means and connecting said rear end of said engine supporting means with said frame rear end whereby said frame rear end portion is suspended on said rear wheel shaft means with said engine means counterbalancing the weight of said frame rear end portion.

4. An engine and rear end suspension for a vehicle, comprising, in combination, a frame rear end portion having a frame rear end; rear wheel shaft means located forwardly of said frame rear end and above said frame rear end portion; an engine supporting frame including two lateral members having front ends and rear ends, a tubular member enveloping said rear wheel shaft means and rigidly connecting said lateral members at points located intermediate the ends of the same, and a connecting member rigidly connecting said front ends of said lateral members; an engine means mounted on said connecting member and on said tubular member intermediate said lateral members; supporting means consisting of a resilient material and connecting said front ends of said lateral members and said frame rear end portion; and resilient means connecting the rear ends of said lateral members with said frame rear end whereby said frame rear end portion is suspended on said rear wheel shaft means with said engine means partly counterbalancing the weight of said frame rear end portion.

5. An engine and rear end suspension for a vehicle, comprising, in combination, a frame rear end portion having a frame rear end; rear wheel shaft means located forwardly of said frame rear end and above said frame rear end portion; an engine supporting frame including two lateral members having front ends and rear ends, a tubular member enveloping said rear wheel shaft means and rigidly connecting said lateral members at points located intermediate the ends of the same, and a connecting member rigidly connecting said front ends of said lateral members; an engine means mounted on said connecting member and on said tubular member intermediate said lateral members; supporting rubber means connecting said front ends of said lateral members and said frame rear end portion; and resilient means connecting the rear ends of said lateral members with said frame rear end whereby said frame rear end portion is suspended on said rear wheel shaft means with said engine means partly counterbalancing the weight of said frame rear end portion.

6. An engine and rear end suspension for a vehicle, comprising, in combination, a frame rear end portion having a frame rear end; rear wheel shaft means located forwardly of said frame rear end and above said frame rear end portion; an engine supporting frame including two lateral members having front ends and rear ends, a tubular member enveloping said rear wheel shaft means and rigidly connecting said lateral members at points located intermediate the ends of the same, and a connecting member rigidly connecting said front ends of said lateral members; an engine means mounted on said connecting member and on said tubular member intermediate said lateral members; a pair of first downwardly projecting brackets secured to said lateral members intermediate said tubular member and said connecting member and having front faces; a pair of second upwardly projecting brackets secured to said frame rear end portion and having rear faces located opposite and spaced from said front faces of said first brackets; a pair of supporting rubber blocks, each rubber block located between opposite front and rear faces of said brackets and fixedly secured to the same; pin means on said rear ends of said lateral members and on said frame rear end; and a pair of rubber loop means passing about said pin means and suspending said frame rear end portion on said tubular member and on said rear wheel shaft means.

7. An engine and rear end suspension for a vehicle, comprising, in combination, a frame rear end portion having a frame rear end; rear wheel shaft means located forwardly of said frame rear end and above said frame rear end portion; an engine supporting frame including two lateral members having front ends and rear ends, a tubular member enveloping said rear wheel shaft means and rigidly connecting said lateral members at points located intermediate the ends of the same, and a connecting member rigidly connecting said front ends of said lateral members; an engine means mounted on said connecting member and on said tubular member intermediate said lateral members; a pair of first downwardly projecting brackets secured to said lateral members intermediate said tubular member and said connecting member and having front faces; a pair of second upwardly projecting brackets secured to said frame rear end portion and having rear faces located opposite and spaced from said front faces of said first brackets; a pair of supporting rubber blocks, each rubber block located between opposite front and rear faces of said brackets and fixedly secured to the same; another connecting member connecting said rear ends of said lateral members; a pair of bracket members including pins and mounted on said rear ends of said lateral members; another pair of bracket members secured to said frame rear end and including pins; and a pair of rubber loops passing about said pins and suspending said frame rear end portion.

8. An end suspension for a vehicle comprising, in combination, a frame end portion having a frame end; a wheel means including a shaft located spaced from said frame end and in the region of said frame end portion; a supporting means pivotally mounted on said shaft and having one end located on one side and the other end located on the other side of said shaft, said one end being spaced from said frame end a shorter distance than said other end of said supporting means; first pin means secured to said one end of said supporting means; second pin means secured to said frame end; a pair of loops consisting of a resilient material passing about said first and second pin means and connecting said one end of said load supporting means with said frame end; first bracket means secured to said other end of said supporting means; second bracket means secured to said frame end portion spaced from said frame end; resilient means secured to said first and second bracket means and engine means at least partly supported on said other end of said supporting means whereby said frame end portion is suspended on said shaft with said engine means counter-balancing the weight of a load acting on said frame.

9. An end suspension for a vehicle comprising, in combination, a frame end portion having a frame end; a wheel means including a shaft located spaced from said frame end and above said frame end portion; a supporting means pivotally mounted on said shaft and having one end located on one side and the other end located on the other side of said shaft, said one end being spaced from said frame end a shorter distance than said other end of said supporting means; first pin means secured to said one end of said supporting means; second pin means secured to said frame end; a pair of loops consisting of a resilient material passing about said first and second pin means and connecting said one end of said load supporting means with said frame end; first bracket means secured to said other end of said supporting means; second bracket means secured to said frame end portion spaced from said frame end; resilient means located between and secured to said first and second bracket means; and engine means at least partly supported on said other end of said supporting means whereby said frame end portion is suspended on said shaft with said engine means counter-balancing the weight of a load acting on said frame.

10. An end suspension for a vehicle comprising, in combination, a frame end portion having a frame end; a wheel means including a shaft located above said frame end and in the region of said frame end portion; a supporting means pivotally mounted on said shaft and having one end located on one side and the other end located on the other side of said shaft, said one end being spaced from said frame end a shorter distance than said other end of said supporting means; first pin means secured to said one end of said supporting means; second pin means secured to said frame end; a pair of loops consisting of a resilient material passing about said first and second pin means and connecting said one end of said load supporting means with said frame end; first bracket means secured to said other end of said supporting means; second bracket means secured to said frame end portion spaced from said frame end; second resilient means secured to said first and second bracket means and extending parallel to said frame in substantially horizontal direction; and engine means at least partly supported on said other end of said supporting means whereby said frame end portion is suspended on said shaft with said engine means counter-balancing the weight of a load acting on said frame.

References Cited in the file of this patent

UNITED STATES PATENTS

| | | |
|---|---|---|
| 1,153,602 | Chapin | Sept. 14, 1915 |
| 1,154,500 | Forschler | Sept. 21, 1915 |
| 1,946,948 | Roos | Feb. 13, 1934 |
| 2,019,139 | Kliesrath | Oct. 29, 1935 |
| 2,051,474 | Ford | Aug. 18, 1936 |
| 2,075,746 | Neiman | Mar. 30, 1937 |
| 2,081,965 | Trott | June 1, 1937 |
| 2,085,591 | Kliesrath | June 29, 1937 |
| 2,169,670 | Wagner | Aug. 15, 1939 |
| 2,200,798 | Megow | May 14, 1940 |
| 2,393,623 | Ehrenberg | Jan. 29, 1946 |
| 2,604,317 | Koller | July 22, 1952 |
| 2,689,014 | Nallinger et al. | Sept. 14, 1954 |
| 2,708,003 | Nallinger et al. | May 10, 1955 |

FOREIGN PATENTS

| | | |
|---|---|---|
| 541,826 | France | May 8, 1922 |